Nov. 29, 1938.  W. E. URSCHEL ET AL  2,138,262
CUTTING MACHINE
Filed Sept. 14, 1936   3 Sheets-Sheet 1

INVENTORS
William E. Urschel
Joe Richard Urschel
By: Cox & Moore ATTORNEYS.

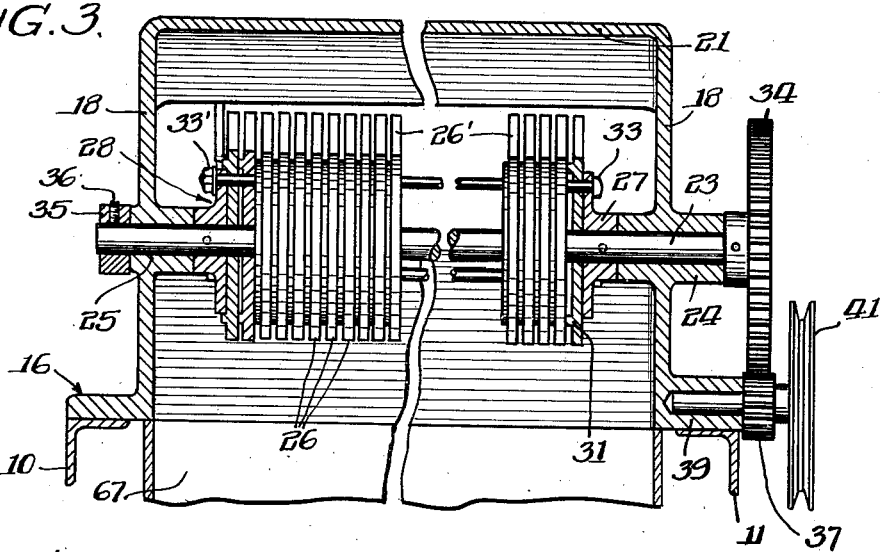
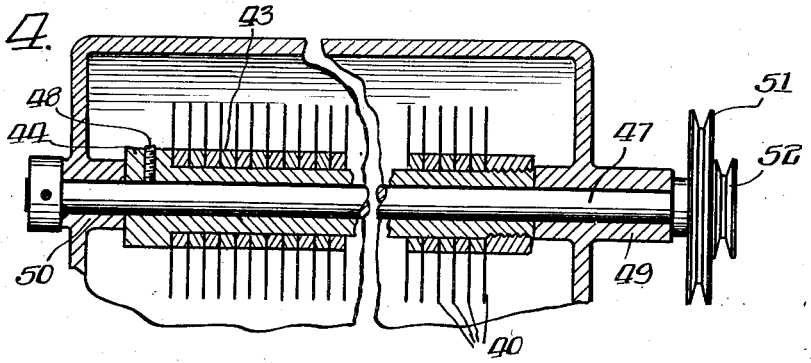
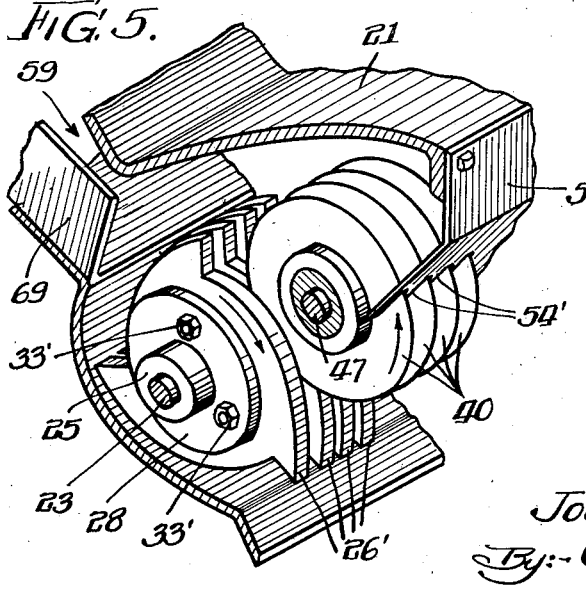
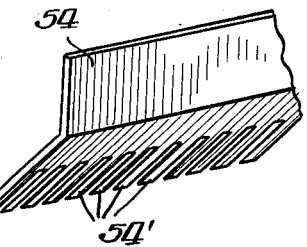

Nov. 29, 1938.   W. E. URSCHEL ET AL   2,138,262
CUTTING MACHINE
Filed Sept. 14, 1936   3 Sheets-Sheet 3
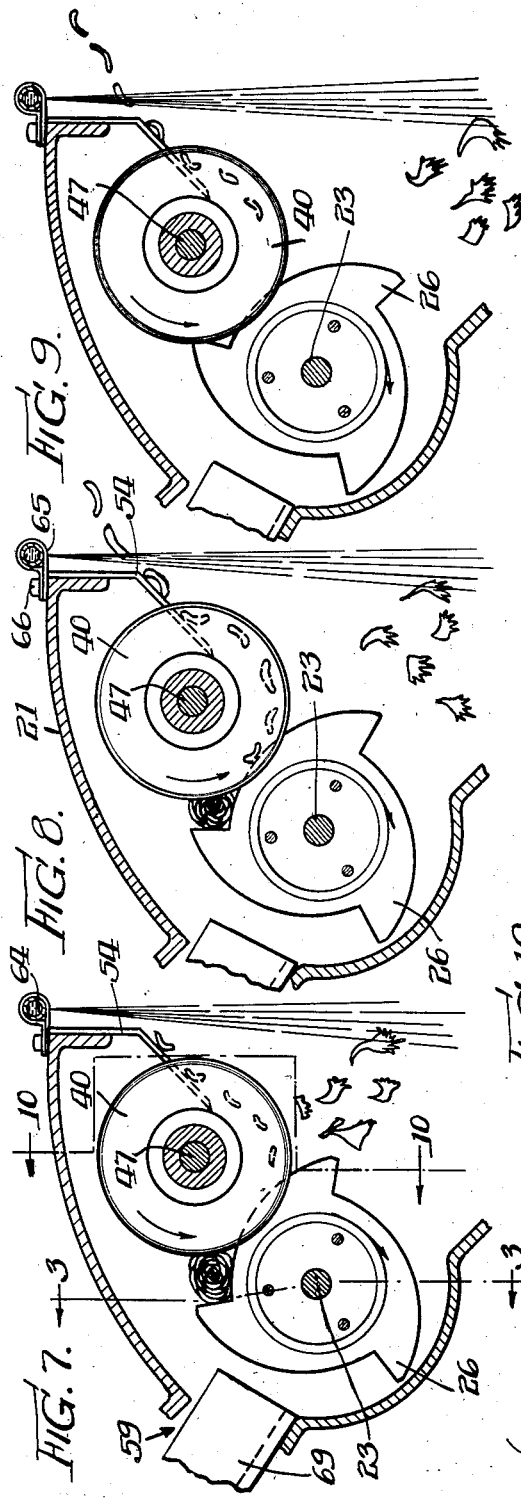
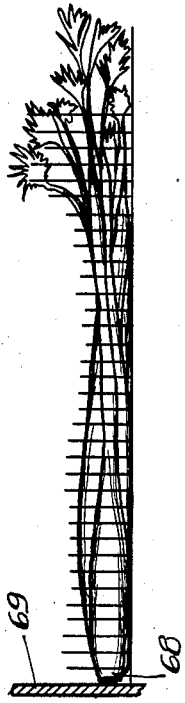
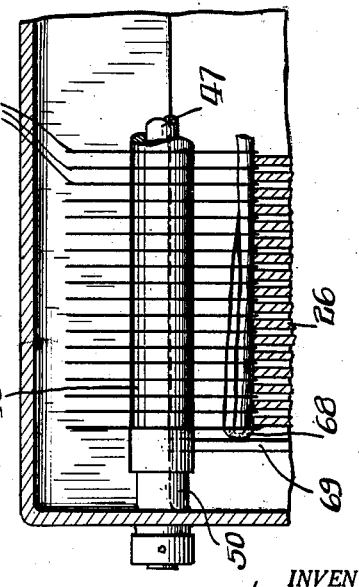

Patented Nov. 29, 1938

2,138,262

UNITED STATES PATENT OFFICE 2,138,262

CUTTING MACHINE

William E. Urschel and Joe Richard Urschel, Valparaiso, Ind.

Application September 14, 1936, Serial No. 100,607

10 Claims. (Cl. 146—98)

This invention relates to a cutting machine, and more particularly to a device for transversely dividing celery and other vegetables into shorter lengths.

It is therefore one of the objects of this invention to provide means for dividing bunches of celery into a plurality of small pieces.

It is another object of this invention to provide a new and improved device for dividing a piece of vegetable or other material capable of being sliced or sawed into a plurality of small pieces by transverse cuts made simultaneously thereon.

Yet another object of this invention is to provide a new and improved cutting mechanism which will not only separate bunches of celery and the like by a plurality of transverse cuts, but will cause a separation of the leaves and chaff from the stalk pieces.

A further object of this invention is to provide a machine which will, in an improved and expedient manner, divide celery and the like into a plurality of transverse pieces without the necessity of previously separating the stalks or trimming the leaves.

These and numerous other objects will be apparent upon reference to the following specification when taken in connection with the accompanying drawings, which disclose a preferred illustrative embodiment constructed in accordance with the principles of the invention.

Referring to the drawings:

Fig. 3 is a view in section taken upon the line 3—3 of Fig. 7 and omitting the drive belts and supporting legs.

Fig. 4 is a partial sectional view taken on the vertical diameter of circular knife assembly and illustrating the assembly broken away from the remainder of the machine.

Fig. 5 is a perspective detail view along a section adjacent the ends of the feeding rotor and the circular cutting blades showing their disposition in assembled relationship.

Fig. 6 is a perspective view of a portion of the ejector element.

Fig. 7 is a diagrammatic section taken transversely at the end of the cutter and feeding rotor, and illustrating the position of parts at the instant of feeding a stalk of celery into the blades.

Fig. 8 is a diagrammatic view taken in the same position as Fig. 7, but illustrating the positioning of the cut portions of the celery and the leaves after slicing has begun.

Fig. 9 is a diagrammatic view similar to Figs. 7 and 8, but illustrating the manner in which the cut portions of celery are tossed upwardly into space by the knives.

Fig. 10 is a partial sectional elevation taken on the line 10—10 of Fig. 7, and showing a stalk of celery in cutting position.

Fig. 11 is a view showing a stalk of celery in position abutting the gauge plate and illustrating the points at which a plurality of transverse cuts are made by the machine.

Figures 1, 2:
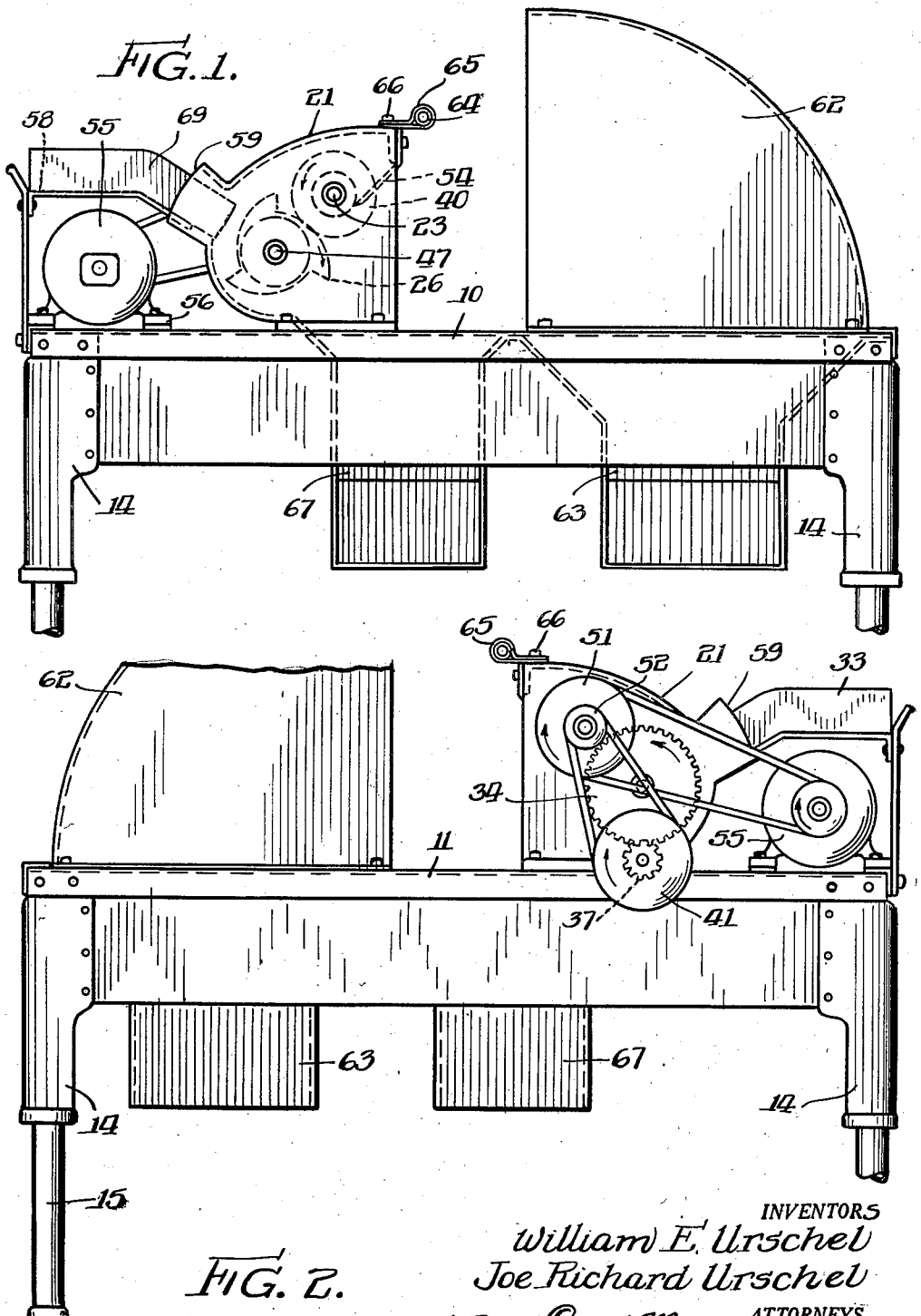
Fig. 1 is a side elevation of the machine presented for illustrative purposes.
Fig. 2 is an elevation of the side opposite to the one shown in Fig. 1.

In the drawings there is disclosed a main frame forming a support for the cutting mechanism, comprising two parallel angle bars 10 and 11, see Figs. 1 and 2, which are maintained in spaced relationship by transverse angle members 12 and 13. Four corner members 14 of identical construction are secured at the respective corners of the main frame and the longitudinal and transverse angle members are fastened by riveting, or other means, to these members. Each of the corner members 14 is provided with an elongated, vertical, circular bore opening at its lower extremity and adapted to receive one of the tubular legs 15. The legs 15 are maintained in their respective corner members by means of a set screw, not shown. Thus the legs may be positioned at any desired position in the bore, and the simple steps of releasing the set screws and tightening them after the legs are moved to a new position, form a ready means for adjusting the frame to various elevations above the floor line.

A housing having sides 18 and top 21 encloses the cutting mechanism and is provided with horizontally extending flanges 16 adjacent the bottom thereof, serving to support the housing upon the angle members 10 and 11. Bolts 19 pass through apertures in the flange and the corresponding angle member, securely fastening the housing in operative position. The housing has a feed opening provided with lips 59 into which the material is introduced for the cutting operation.

Situated in the housing is a shaft 23, journalled rotatably in bearings provided by the bosses 24 and 25 on the side walls 18. On said shaft are secured rigidly, as by means of pins or the like, two flanges 27 and 28. Between these flanges are positioned a series of co-axial ratchet shaped impellers 26, having shoulder-like faces 26'. Shoulders 31, formed upon one of the faces of the impeller discs 26, are adapted to abut the opposing face of the adjacent disc and thereby provide spaces of predetermined width between the outstanding shoulder portions 26' of the ratchet shaped impeller discs. Tie bolts 33 pass longitudinally through apertures in the flanges 27 and 28, and in the impeller members 26, and serve to clamp these elements rigidly together with the aid of nuts 33' threaded thereon. A spur gear 34 is pinned or otherwise mounted securely at one extremity of the shaft 23, while a collar 35, secured by set screw 36, serves to position the shaft in its bearings and prevent transverse displacement thereof. A stud 38 is mounted rigidly by conventional means in a boss 39 formed on the wall 18 and upon the stud is rotatably mounted a pinion 37 which engages the gear 34. A V-groove pulley 41 is also mounted for rotatable movement on the stud 38 by having its hub rigidly fixed to the hub of the pinion 37.

The circular cutting knives, shown specifically in Figs. 4 and 5, are supported upon shaft 47, which is mounted for rotation in bearings formed in the bosses 49 and 50. Shaft 47 carries thereon a co-axial sleeve 44, which is securely positioned by set screw 48. Circular knives 40 are adapted to fit securely over the sleeve 48 and are maintained in predetermined, spaced relationship by a series of annular collars 43. Shoulder 45 and nut 46 cooperate with the threaded extremity of the spindle 44 to position the knives in place upon the spindle. V-grooved pulleys 51 and 52 are secured at one end of the shaft for rotation therewith, while a collar 53 is secured by a set screw or pin in a conventional manner at the other end to prevent axial displacement in the bearings. Thus there is provided a gang of parallel spaced knives adapted for continuous rotation.

An ejector member 54 having a plurality of fingers 54' is mounted at the forward upper edge of the casing, the fingers being so arranged as to extend downwardly in spaced relationship between the circular blades 40 and serve thereby to remove the sliced sections of celery or other material lodged therebetween.

The rotating members are driven by a motor 55 having a V-groove pulley 57 secured to the drive shaft thereof, shown in Figs. 1 and 2, and which is bolted to the transverse frame member 12 and a second transverse supporting bar 56. A drive belt 60, passing over the pulley 57 and the pulley 51, serves to rotate the shaft 47 supporting the gang of cutting knives. A second drive belt 61 passing over the pulley 52 and the pulley 41 rotates the pinion 37 engaging the gear 34, and thus drives the conveying rotor.

A feed table 58 is positioned over the motor 55 and has its forward end residing in a cut-away portion of the feed opening 59 in the housing, and its rearward portion riveted to the upright portion 60, which is fastened at its lower extremity to the transverse angle member 12.

Moreover, in order to position material being fed, there is provided the upstanding wall 69 on the feed table 58. This wall is extended forwardly through the feed opening 59 to a point just adjacent the path of the shoulders 26' and serves to position the end of the material being sliced, in proper relationship to the cutters.

In addition a spray pipe 64, having a series of small openings along the bottom surface thereof is positioned by clamps 65 and machine screws 66 adjacent the upper forward ends of the housing, and thus adapted to provide a downwardly projected spray of water across the discharge opening.

Below this opening there is positioned a chute or receptacle 67 for the disposal of the leaves and root portion.

Spaced oppositely from the opening is likewise a hood 62 having an open front face and an arcuate rear wall below which is a second container or chute for the collection of the cut portions of the product. The hood 62 is provided with out-turned flanges at the base thereof, through which it may be bolted or riveted to the frame members 10 and 11. The chute may similarly be secured to the frame.

In operation the motor 55 drives the pulley 51 by means of the V-belt 60, transmitting rotary motion to the gang of cutting blades. The pulley 52 integral with the pulley 51 then drives the pulley 41 through the V belt 61, causing pinion 37 to drive gear 34, and thus rotating the shaft 23 and the conveying rotor in a clock-wise direction, as viewed in Figs. 7 to 9. Bunches of celery, for instance, are placed transversely upon feed table 58, so that the root ends thereof are in contact with the vertically disposed wall 69, and are moved forward manually through the feed opening 59 of the housing until they are engaged by the shoulders 26' on a tooth portion of the conveying rotor 26. It will be apparent that the celery or the like will be urged upwardly and forwardly in clock-wise direction by the shoulder 26' until it comes in contact with the gange of circular knives 40, as diagrammatically illustrated in Figs. 7, 8 and 9.

The speed of rotation of the circular knife shaft is preferably considerably faster than that of the conveying rotor; for instance, a speed ratio of 20 to 1, may be employed. Moreover, the conveying rotor is so arranged that the shoulders 26' pass between respective adjacent knives of the rotating cutter. Therefore, the pieces as 'y are cut by the knives 40, being wedged therebetween by the movement of the shoulders 26', are forcibly conveyed or torn away from the bunch as they are cut, as illustrated diagrammatically in Fig. 10. Upon further rotation, however, they impinge the fingers of the ejector 54 and are thereby released. The centrifugal force acting upon the pieces and induced by their contact with the knives 40, however, will cause the cut pieces to be thrown outwardly and upwardly into the hood-like receptacle 62. Pieces impinging upon the back arcuate wall of the hood 62 will expend their forward momentum and drop into the discharge container or chute 63, which may be arranged to collect the cut pieces or to guide them into any suitable receptacle or conveyor.

It will be noted that the leafy portions, due to their lack of rigidity will not tend to become wedged between the knives and therefore will fall downwardly, as shown progressively in Figs. 7, 8 and 9. Should any leaves or small pieces adhere to the knives 40 they will, however, be removed upon contact with the ejector 54, but since their mass is relatively negligible they will likewise tend to fall downwardly soon after being discharged. To further insure operation in this manner a spray of water directed downwardly from the spray pipe 64 will impinge the leafy material, increasing their mass and tending to arrest any forward motion, whereby they will be made to fall downwardly into the discharge chute 67.

The butt end or undesirable root portion 68 of the celery, shown in Figs. 10 and 11, is more or less accurately positioned by the side wall 69, forming a continuation of the feed table. The side wall thus acts as a gauge plate and tends to position the celery for contact with the cutting knives in the relationship illustrated in Figs. 10 and 11, or, in other words, with the butt portion just beyond the inmost knife in the series. Therefore, it will be obvious that the undesirable end portion will have no opportunity of becoming wedged between the knives and upon being severed will fall downwardly into the chute 67 with the leafy portions.

It will be apparent that various other means may be employed to guide the material to be cut into contact with the conveying rotor and, moreover, the plate 69 may be made adjustable transversely in accordance with the type or condition of the material treated.

Moreover, it will be obvious that machines coming within the purview of the inventor are not limited in use to the cutting of celery or to any other vegetable material, but may be employed to divide and separate almost any desired substance or object capable of being cut by knives or equivalent means. So too knives of various kinds and quality may be employed as well as cutters having irregular edges or cutting teeth, or their equivalent cutting means, all of which are considered as blades or knives for the purpose of the present disclosure.

It will be obvious from the foregoing that changes may be made in the form, construction and arrangement of the parts without departing from the spirit of the invention or sacrificing any of its advantages, and the right is hereby reserved to make all such changes as fairly fall within the scope of the following claims.

Having thus described our invention, what we claim as new and desire to secure by Letters Patent is as follows:

1. In a machine for cutting celery and the like, having a stalk and leafy portion, a gang of rotatab'e cutting blades, a rotatable shoulder arranged to engage a piece of material thereon and impinge it across and transversely to the cutting edges of the blades, means to cause the cut pieces of stalk to be forced into the blade to a point where they are wedgingly engaged between the blades whereby to be supported solely thereby and carried to a discharge point while the leafy material is permitted to fall freely, and a gauge plate arranged to direct the end of said material beyond the endmost cutting blade whereby the end portion of said material will be trimmed and permitted to fall with the leafy material.

2. In a machine for slicing celery and the like, a plurality of parallel rotatable cutting blades arranged with horizontal axes, means to present material transversely to said blades, means to cause more or less rigid portions of said cut material to be wedged between said blades and rotate rapidly therewith, means to free said rotating pieces whereby to project them in a generally horizontal path, said last named means comprising fingers located between the blades and on the upwardly rotating side thereof, said fingers having contact surfaces extending upwardly and outwardly with respect to the axes of the cutting blades, said contact surfaces being arranged in the path of movement of material conveyed rotationally between said blades and being so formed at all points between said path and the peripheral cutting edges of the blades that all radii of the blades intersecting the said surfaces pass from the rearward to the forward side of said surfaces as they progress radially outwardly of the center of said blades, and receding from the radii of the blades in the direction of rotation thereof at all points adjacent the blades.

3. In a machine for cutting celery and like material having a stalk and a leafy portion, a gang of rotatable substantially parallel spaced cutting blades, means to rotate the said blades about their axes, a rotatably mounted impinging member having annular grooves formed in its peripheral surface and being mounted adjacent said gang of blades with the edges of the blades located in said grooves at all times, substantially radially extending shoulders arranged on said impinging member and adapted to pass between the blades when the impinging member is rotated, means to deposit stalks of material to be cut in front of said shoulders and means to rotate the impinging means in a direction so that the shoulders are moved toward and transversely of the edge of the blades to impinge the material across and transversely to the cutting edges of the blades, the impinger being so arranged that the shoulders are substantially parallel to a line tangent to the contacted portions of the said cutting edges of the blades throughout the time the substance is being forced thereinto whereby to directly force the cut pieces of stalk wedgingly between the blades to be supported thereby.

4. In a machine for cutting celery and like material having a stalk and a leafy portion, a gang of rotatable substantially parallel spaced cutting blades, means to rotate the said blades about their axes, a rotatably mounted impinging member having annular grooves formed in its peripheral surface and being mounted adjacent said gang of blades with the edges of the blades located in said grooves at all times, substantially radially extending shoulders arranged on said impinging member and adapted to pass between the blades when the impinging member is rotated, means to deposit stalks of material to be cut in front of said shoulders and means to rotate the impinging means in a direction so that the shoulders are moved toward and transversely of the edge of the blades to impinge the material across and transversely to the cutting edges of the blades, the impinger being so arranged that the shoulders are substantially parallel to a line tangent to the contacted portions of the said cutting edges of the blades throughout the time the substance is being forced thereinto whereby to directly force the cut pieces of stalk wedgingly between the blades to be supported thereby, and means to release the stalk pieces from the blades at a discharge point.

5. In a machine for cutting celery and like material having a stalk and a leafy portion, a gang of rotatable substantially parallel spaced cutting blades, means to rotate the said blades about their axes, a rotatably mounted impinging member having annular grooves formed in its peripheral surface and being mounted adjacent said gang of blades with the edges of the blades located in said grooves at all times, substantially radially extending shoulders arranged on said impinging member and adapted to pass between the blades when the impinging member is rotated, means to deposit stalks of material to be cut in front of said shoulders and means to rotate the impinging means in a diretcion so that the shoulders are moved toward and transversely of the edge of the blades to impinge the material across and transversely to the cutting edges of the blades, the impinger being so arranged that the shoulders are substantially parallel to a line tangent to the contacted portions of the said cutting edges of the blades throughout the time the substance is being forced thereinto whereby to directly force the cut pieces of stalk wedgingly between the blades to be supported thereby, means rotationally to convey the cut pieces while so supported, means to release the stalk pieces from the blades at a discharge point, and means to toss the said stalk pieces a substantial horizontal distance to a predetermined station upon their release.

6. In a machine for cutting celery and like material having a stalk and a leafy portion, a gang of rotatable, substantially parallel, spaced, substantially coaxial cutting blades, means to rotate the said blades about their axis, a rotatably mounted impinging member positioned in generally parallel adjacent juxtaposition to the axis of said blades, substantially radially extending shoulders arranged on said impinging member and adapted to pass between the blades when the impinging member is rotated, means to deposit stalks of material to be cut in front of said shoulders and means to rotate the impinging means in a direction so that the shoulders are moved toward and transversely of the edge of the blades to impinge the material across and transversely to the cutting edges of the blades, the impinger being so arranged with respect to the sectional dimension of the material to be cut that the shoulder is substantially parallel to a tangent to said cutting edges at the point of contact, at the time when the material is impinged thereacross, said shoulders substantially completely entering the space between the blades whereby to force the cut pieces directly and fully between the blades to wedgingly position and support them.

7. A machine for slicing celery or the like comprising a gang of rotatable cutting blades, means to rotate said blades, means to present an elongated stalk of celery or the like while arranged generally parallel to the axis of said blades while holding said stalk against substantial movement in the direction of blade rotation, means to force the stalk in a direction substantially directly across the cutting edges of the blades in cutting relationship while so presented, the cutting blades including means to clampingly wedge the severed pieces between the blades, said presenting means operating at a relatively low speed with respect to the speed of the blades whereby sections of material as they are severed and clamped between the blades are torn from the uncut portions thereof while said uncut portions are supported by said supporting means against movement in the direction of rotation of said cutting edges.

8. A machine for slicing celery and the like comprising a gang of rotatable, parallel cutting blades, means to rotate said blades, means for supporting an elongated stalk of celery or the like while arranged generally parallel to the axis of said blades, while holding said stalk against substantial movement in the direction of blade rotation, said supporting means being operable to force said stalk in a direction substantially directly across the cutting edges of the blades while so presented and transversely to the direction of movement of the cutting edges, means for actuating said supporting and presenting means at a predetermined rate relative to the blades to produce severed pieces, the cutting blades including means to cause the severed pieces to be wedged clampingly between adjacent parallel blades, the said gang of blades in the cutting and clamping regions thereof being rotated at a substantially greater rate of speed than the said supporting and presenting means whereby sections of material as they are severed and clamped between the blades are torn bodily from uncut portions thereof while said uncut portions are supported by the said supporting means against substantial movement in the direction of rotation of said uncut edges.

9. The process of cutting and dividing celery which comprises presenting the celery at a predetermined rate of feed to a gang of parallel, movable cutting blades, forcing the cut sections into wedging engagement between adjacent blades, and moving the blades at a relatively great rate of speed with respect to the rate of presentation whereby portions of the stalk severed and wedged between the blades are torn bodily away from the uncut portions of the stalk.

10. In a cutting machine, a gang of rotatable cutting blades, means to feed material transversely to said blades, means to cut pieces of material having a predetermined rigidity to be carried rotationally therewith during motion thereof, and means to project said pieces during said motion in a predetermined path while relatively non-rigid portions are permitted to drop upon being severed, said last named means comprising finger members extending between the blades, said finger members having a surface adapted to be contacted by cut pieces of material conveyed rotationally between the blades, said surface at all points from said point of contact to the peripheral cutting edge of the blade transversely intersecting the rotational path of conveyance of said cut pieces of material, said surface being so arranged that tangents drawn through said path of conveyance at the points of contact with the said surface form an obtuse angle with said surface, which obtuse angle is located forwardly of said surface with respect to the direction of rotation of the blades and tangents and radially outwardly of said tangents.

WILLIAM E. URSCHEL.
JOE RICHARD URSCHEL.